(12) United States Patent
Hayakawa

(10) Patent No.: US 9,880,262 B2
(45) Date of Patent: Jan. 30, 2018

(54) RADAR APPARATUS

(71) Applicant: FUJITSU TEN LIMITED, Kobe-shi, Hyogo (JP)

(72) Inventor: Eisuke Hayakawa, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 496 days.

(21) Appl. No.: 14/575,629

(22) Filed: Dec. 18, 2014

(65) Prior Publication Data

US 2015/0226838 A1 Aug. 13, 2015

(30) Foreign Application Priority Data

Feb. 12, 2014 (JP) ................. 2014-023956

(51) Int. Cl.
| | |
|---|---|
| *G01S 7/40* | (2006.01) |
| *B60W 50/00* | (2006.01) |
| *G01P 15/00* | (2006.01) |
| *G01S 13/02* | (2006.01) |
| *G01S 13/86* | (2006.01) |
| *G01S 13/93* | (2006.01) |
| *H01Q 1/32* | (2006.01) |
| *H01Q 3/26* | (2006.01) |
| *H01Q 3/36* | (2006.01) |
| *G01S 13/34* | (2006.01) |

(52) U.S. Cl.
CPC ....... *G01S 7/4026* (2013.01); *B60W 50/0098* (2013.01); *G01P 15/00* (2013.01); *G01S 13/02* (2013.01); *G01S 13/86* (2013.01); *G01S 13/931* (2013.01); *H01Q 1/3233* (2013.01); *H01Q 3/267* (2013.01); *H01Q 3/36* (2013.01); *G01S 13/345* (2013.01); *G01S 2007/4034* (2013.01); *G01S 2013/0245* (2013.01); *G01S 2013/9353* (2013.01)

(58) Field of Classification Search
CPC .... G01S 7/40; G01S 7/4026; G01S 2007/403; G01S 2007/4034; G01S 13/931; G01S 2013/9371; H01Q 1/3233; H01Q 3/267; H01Q 3/36
USPC ............................ 342/70–72, 165, 173, 174
See application file for complete search history.

(56) References Cited

U.S. PATENT DOCUMENTS 4,121,209 A * 10/1978 ap Rhys .............. G01S 13/5242
342/157
5,008,678 A * 4/1991 Herman .................. G01S 7/032
342/158

(Continued)

FOREIGN PATENT DOCUMENTS

| JP | 2001-174540 A | 6/2001 |
|---|---|---|
| JP | 2003-035768 A | 2/2003 |

(Continued)

*Primary Examiner* — Peter M Bythrow
(74) *Attorney, Agent, or Firm* — Oliff PLC

(57) ABSTRACT

A radar apparatus includes: a transmitting antenna including a first antenna and a second antenna that transmit transmission waves; a signal processor configured to determine a mounted state of the radar apparatus on the vehicle; and a phase adjuster that adjusts at least one of phases of transmission signals output to the first antenna and the second antenna of the transmitting antenna. The signal processor controls the phase adjuster to adjust the at least one of the phases of the transmission signals based on the mounted state determined by the signal processor.

7 Claims, 16 Drawing Sheets

(56) References Cited

U.S. PATENT DOCUMENTS

| | | | | |
|---|---|---|---|---|
| 5,149,011 A * | 9/1992 | Gratt | ............... | F41G 7/28 244/3.19 |
| 5,313,213 A * | 5/1994 | Neumann | ............ | B60Q 1/0023 342/165 |
| 5,623,270 A * | 4/1997 | Kempkes | ............... | H01Q 1/005 342/174 |
| 5,977,906 A * | 11/1999 | Ameen | ................ | G01S 7/4026 342/165 |
| 6,020,844 A * | 2/2000 | Bai | ................ | G01S 7/4026 342/147 |
| 6,122,040 A * | 9/2000 | Arita | ................ | B60T 7/22 180/169 |
| 6,437,731 B1 * | 8/2002 | Henrio | ................ | G01S 7/4026 342/165 |
| 6,556,166 B1 * | 4/2003 | Searcy | ................ | G01S 7/4026 342/165 |
| 6,636,172 B1 * | 10/2003 | Prestl | ................ | G01S 7/4026 342/173 |
| 6,694,277 B2 * | 2/2004 | Schneider | ............ | G01S 7/4017 342/70 |
| 6,750,811 B2 * | 6/2004 | Asanuma | ............ | G01S 7/4026 342/118 |
| 6,771,210 B2 * | 8/2004 | Zoratti | ................ | G01S 7/4026 342/165 |
| 6,778,131 B2 * | 8/2004 | Haney | ................ | G01S 7/4026 342/165 |
| 6,900,755 B2 * | 5/2005 | Richardson | ........ | B60K 31/0008 342/104 |
| 7,079,073 B2 * | 7/2006 | Fujita | ................ | G01S 7/4026 342/165 |
| 7,522,097 B2 * | 4/2009 | Wakeman | ............ | G01S 7/4026 342/13 |
| 7,813,851 B2 * | 10/2010 | Demersseman | ....... | G01B 21/24 180/282 |
| 8,217,829 B2 * | 7/2012 | Shingyoji | ............ | G01S 7/4026 342/165 |
| 8,344,940 B2 * | 1/2013 | Jeong | ................ | G01S 7/4026 342/173 |
| 8,692,707 B2 * | 4/2014 | Lee | ................ | G01S 7/4026 342/141 |
| 8,717,224 B2 * | 5/2014 | Jeong | ................ | G01S 13/4463 342/70 |
| 8,742,980 B2 * | 6/2014 | Shirakawa | ............ | G01S 7/90 342/165 |
| 8,957,808 B2 * | 2/2015 | Ookawa | ............ | G01S 7/4004 342/165 |
| 9,366,751 B2 * | 6/2016 | Steinbuch | ............ | G01S 7/4004 |
| 2005/0024261 A1 * | 2/2005 | Fujita | ................ | G01S 7/4026 342/174 |
| 2007/0132634 A1 * | 6/2007 | Wakeman | ............ | G01S 7/4026 342/174 |
| 2009/0046000 A1 * | 2/2009 | Matsuoka | ............ | G01S 13/426 342/147 |
| 2011/0074620 A1 * | 3/2011 | Wintermantel | ........ | G01S 7/032 342/70 |

FOREIGN PATENT DOCUMENTS

| | | |
|---|---|---|
| JP | A-2006-516370 | 6/2006 |
| JP | A-2007-240184 | 9/2007 |
| JP | A-2008-096199 | 4/2008 |
| JP | 2009-067156 A | 4/2009 |
| JP | A-2010-071889 | 4/2010 |
| WO | 2010/109517 A1 | 9/2010 |

* cited by examiner

| | TRANSMITTING ANTENNA | FIRST TIME PERIOD SE1 PHASE DIFFERENCE(°) | SECOND TIME PERIOD SE2 PHASE DIFFERENCE(°) |
|---|---|---|---|
| FIRST PARAMETER | TRANSMISSION SIGNAL SA | −φ1 | ±0 |
| | TRANSMISSION SIGNAL SB | ±0 | ±0 |
| SECOND PARAMETER | TRANSMISSION SIGNAL SA | ±0 | ±0 |
| | TRANSMISSION SIGNAL SB | −φ1 | ±0 |

Fig.8

|  | TRANSMITTING ANTENNA | FIRST TIME PERIOD SE1 PHASE DIFFERENCE(°) | SECOND TIME PERIOD SE2 PHASE DIFFERENCE(°) | THIRD TIME PERIOD SE3 PHASE DIFFERENCE(°) |
|---|---|---|---|---|
| FIRST PARAMETER | TRANSMISSION SIGNAL SA | $-\phi 1$ | $\pm 0$ | $\pm 0$ |
|  | TRANSMISSION SIGNAL SB | $\pm 0$ | $\pm 0$ | $-\phi 2$ |
| SECOND PARAMETER | TRANSMISSION SIGNAL SA | $\pm 0$ | $\pm 0$ | $-\phi 2$ |
|  | TRANSMISSION SIGNAL SB | $-\phi 1$ | $\pm 0$ | $\pm 0$ |

Fig.13

RADAR APPARATUS

BACKGROUND OF THE INVENTION

Field of the Invention

The invention relates to signal processing of a transmission signal.

Description of the Background Art

Generally, a radar apparatus that is mounted on a host vehicle transmits plural types of transmission waves. Some among those waves are a horizontal transmission wave that is transmitted in a horizontal direction in which a transmission axis extends, relative to a road surface, and an upward transmission wave that is transmitted at a predetermined elevation angle relative to the transmission axis. Then, the radar apparatus derives information relating to a target (hereinafter referred to as "target information") based on a reflection wave reflected by the target. The target information includes, for example, a reflection point on an object in a vertical direction relative to a road surface, in other words, a height of the object (target).

A vehicle controller obtains the target information output by the radar apparatus and determines whether the target is an upper object existing above the road, such as a billboard and a traffic sign, or the target is a front vehicle existing in front of the host vehicle, based on the height of the target. Then, the vehicle controller controls the vehicle based on a determined result of the target so as to ensure safety of the user.

The radar apparatus includes a connector that outputs the target information to the vehicle controller (hereinafter referred to as "radar connector"). Then, the radar connector is connected to a connector of the vehicle controller (hereinafter referred to as "vehicle connector") via a cable of a predetermined length. The vehicle controller obtains the target information output by the radar apparatus.

However, in a case where a radar apparatus is mounted on a vehicle, depending on a type of the vehicle, the vehicle connector is located away from the radar connector so that it may be difficult to connect those connectors via the cable. For example, in a case where the radar connector is on one side of a housing of the radar apparatus (e.g. a right side) and the vehicle connector is provided to a portion close to another side of the housing of the radar apparatus (e.g. a left side), in other words, the vehicle connector is provided away from the one side, it may be difficult to connect both the connectors via the cable.

In this case, if the radar apparatus is mounted on the vehicle upside down instead of being mounted in a predetermined mounted state, the connectors can be connected to each other via the cable. However, in the case where the radar apparatus is mounted upside down, the transmission wave that should be transmitted upward is transmitted downward at a predetermined depression angle relative to the transmission axis. Therefore, the radar apparatus cannot derive the height of the target. As a result, the vehicle controller cannot correctly determine whether the target is the upper object or the front vehicle. Thus, the vehicle controller may not control the vehicle so as to ensure safety of the user.

In order that every radar apparatus mounted on the vehicle can transmit the transmission wave in a desired transmission direction (e.g. transmit transmission wave upward), plural types of the radar apparatuses need to be produced, for example, a radar apparatus including the radar connector on one side of the housing and a radar apparatus including the radar connector on another side. However, the plural types of the radar apparatus in different hardware configurations lead to an increase in designing burden and production costs.

SUMMARY OF THE INVENTION

According to one aspect of the invention, a radar apparatus that is mounted on a vehicle includes: a transmitting antenna including a first antenna and a second antenna that transmit transmission waves; a signal processor configured to determine a mounted state of the radar apparatus on the vehicle; and a phase adjuster that adjusts at least one of phases of transmission signals output to the first antenna and the second antenna of the transmitting antenna. The signal processor controls the phase adjuster to adjust the at least one of the phases of the transmission signals based on the mounted state determined by the signal processor.

The radar apparatus can adjust a direction in which the transmission waves are transmitted, to a predetermined direction regardless of the mounted state of the radar on the vehicle.

According to another aspect of the invention, in a case where the signal processor determines that the radar apparatus is mounted on the vehicle in an upside-down mounted state as compared to a predetermined mounted state, the signal processor controls the phase adjuster to adjust at least one of the phases of the transmission signals output to the first antenna and the second antenna.

Even in a case where the radar apparatus is mounted on the vehicle in the upside-down mounted state, the radar apparatus can adjust the direction in which the transmission waves are transmitted.

According to another aspect of the invention, the predetermined mounted state is a state where the first antenna is positioned higher than the second antenna in a direction vertical to a road surface, and the upside-down mounted state is a state where the first antenna is positioned lower than the second antenna in the direction vertical to the road surface.

Even in a case where positions of the antennas are interchanged in the direction vertical to the road surface, the radar apparatus can adjust the direction in which the transmission waves are transmitted, to the predetermined direction.

Therefore, an object of the invention is to provide a technology that can transmit transmission waves in a predetermined direction regardless of a mounted state of a radar apparatus.

These and other objects, features, aspects and advantages of the invention will become more apparent from the following detailed description of the invention when taken in conjunction with the accompanying drawings.

BRIEF DESCRIPTION OF THE DRAWINGS

FIG. 8 illustrates phase information of a first parameter and a second parameter;

FIG. 13 illustrates phase information of a first parameter and a second parameter in a third embodiment;

DESCRIPTION OF THE EMBODIMENTS

Embodiments of the invention are hereinafter explained with reference to the drawings.

First Embodiment 1-1. System Block Diagram

Figure 1:
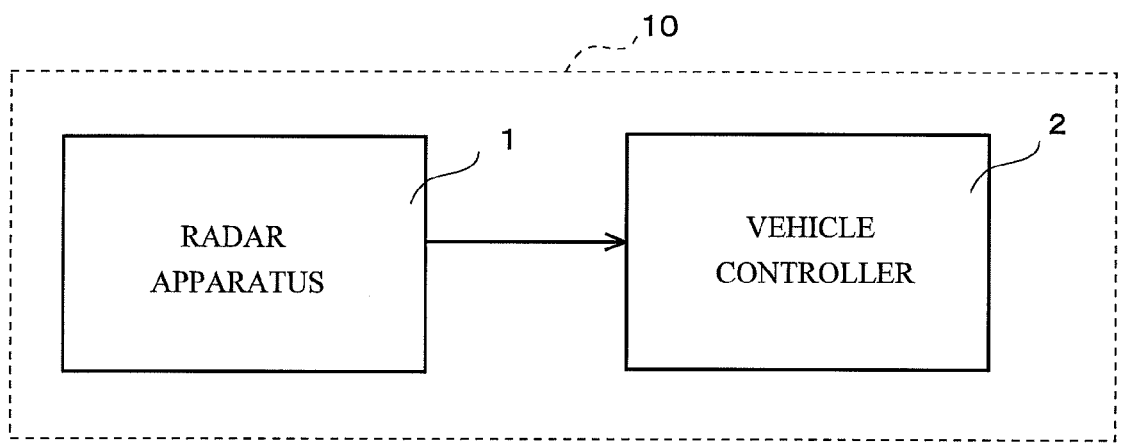
FIG. 1 illustrates a configuration of a vehicle control system of this embodiment.

FIG. 1 illustrates a configuration of a vehicle control system 10 of the embodiment. The vehicle control system 10 is mounted, for example, on a vehicle, such as a car. Hereinafter, a vehicle on which the vehicle control system 10 is mounted is referred to as a "host vehicle." As shown in FIG. 1, the vehicle control system 10 includes a radar apparatus 1 and a vehicle controller 2.

The radar apparatus 1 of the embodiment obtains information of a target (object) (hereinafter referred to as "target information"), such as a front vehicle existing in front of the host vehicle, using a frequency modulated continuous wave (FM-CW). The target information includes a distance from the target to a point where a receiving antenna of the radar apparatus 1 receives a reflection wave reflected by the target (hereinafter referred to as "longitudinal distance") (m), a relative speed of the target relative to the host vehicle (km/h), a distance of the target relative to the host vehicle in a left-right direction (width direction) of the host vehicle (hereinafter referred to as "lateral direction") (m), a distance of the target in a vertical direction from a road surface (hereinafter referred to as "height direction") (m). The radar apparatus 1 outputs the obtained target information to the vehicle controller 2.

The radar apparatus 1 calculates the lateral distance based on angle information of the target. The angle information is derived based on phase information of a reception signal by using a well-known angle estimation method, such as estimation of signal parameters via rotational invariance techniques (ESPRIT), digital beam forming (DFB), propagator method based on an improved spatial-smoothing matrix (PRISM) and multiple signal classification (MUSIC).

Moreover, the radar apparatus 1 calculates the height distance based on a difference value obtained by subtracting a reception level of the reflection wave of a transmission wave transmitted in an upward direction relative to a reference axis from a reception level of the reflection wave of a transmission wave transmitted in a horizontal direction relative to the reference axis, described later. As the difference value becomes greater, the height distance increases. As the difference value becomes smaller, the height distance decreases. The radar apparatus 1 derives the height distance in the vertical direction relative to the road surface, of the target, based on the reflection waves of the plural transmission waves that are transmitted in different directions from one another.

The vehicle controller 2 is connected to a brake, a throttle, etc. of the host vehicle and controls the host vehicle based on the target information output by the radar apparatus 1. In a case where the host vehicle may crash into the front vehicle, the vehicle controller 2 performs a control to protect a passenger of the host vehicle. Thus, the vehicle control system 10 of the embodiment functions as a pre-crash safety system (PCS).

1-2. Block Diagram of Radar Apparatus

Figure 2:
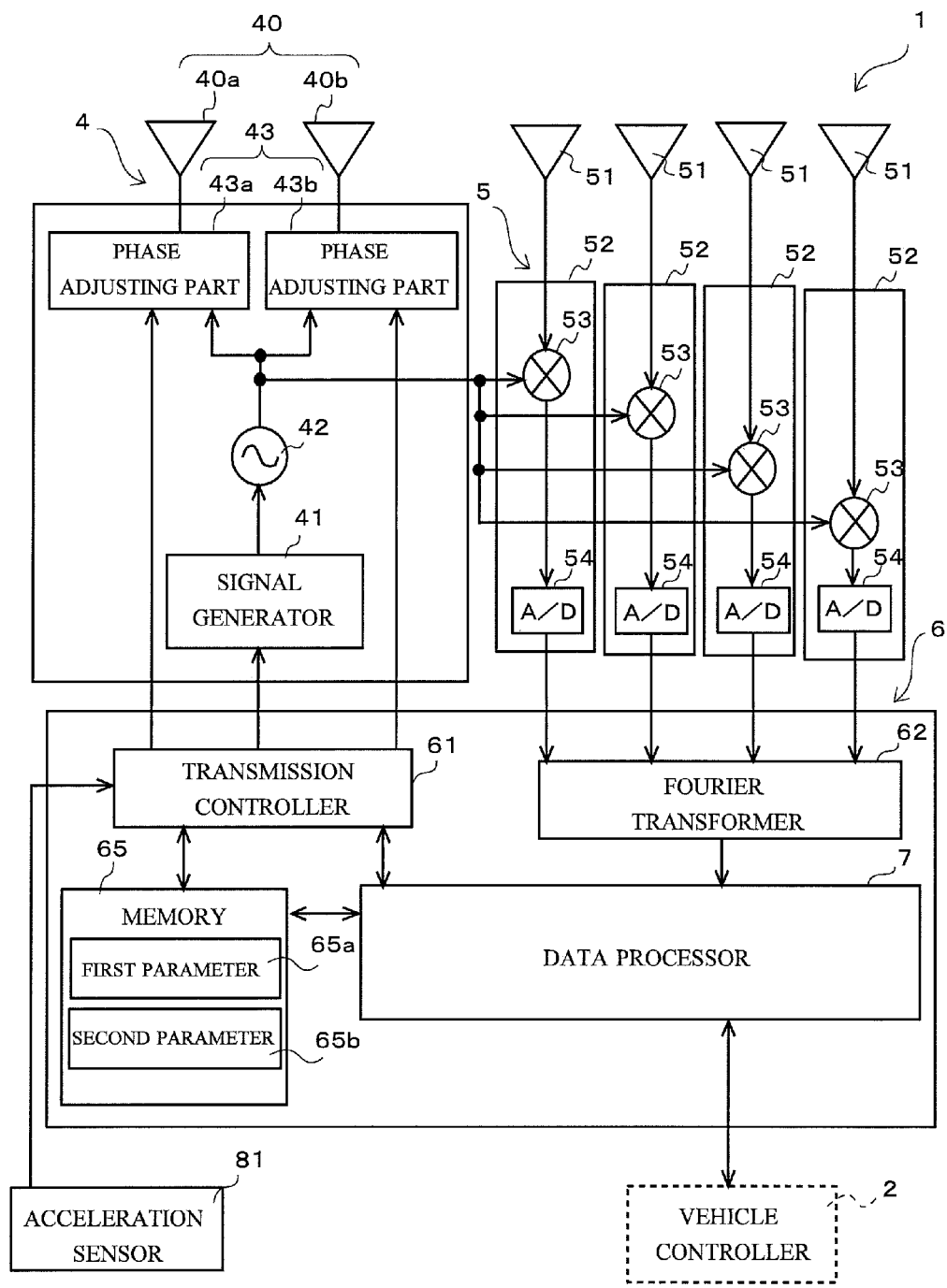
FIG. 2 illustrates a configuration of a radar apparatus.

FIG. 2 illustrates a configuration of the radar apparatus 1. The radar apparatus 1 mainly includes a transmitter 4, a receiver 5, and a signal processor 6.

The transmitter 4 includes a signal generator 41, an oscillator 42 and a phase adjuster 43. The signal generator 41 generates and outputs a triangular wave signal for modulation to the oscillator 42. The oscillator 42 is a voltage-controlled oscillator that controls an oscillation frequency by voltage. The oscillator 42 converts the triangular wave signal for modulation into a millimeter-wave signal (e.g. 76.5 GHz) and outputs the millimeter-wave signal to the phase adjuster 43.

The phase adjuster 43 includes a phase adjusting part 43a and a phase adjusting part 43b and adjusts a phase of a transmission signal output to a transmitting antenna 40. The phase adjusting parts 43a and 43b adjust phases of the transmission signals based on command signals relating to phase adjustment output from a transmission controller 61, described later, and supply the transmission signals of which the phases have been adjusted, to the transmitting antenna 40. A concrete method of adjusting the phases of the transmission signals will be described later.

The transmitting antenna 40 transmits the transmission wave to an outside of the host vehicle based on the transmission signal. Concretely, radio waves based on the transmission signals are transmitted from a transmitting antenna 40a and a transmitting antenna 40b, and the radio waves transmitted from the two transmitting antennas mix together to generate a transmission wave. A phase difference may be caused between the radio waves transmitted from the transmitting antennas 40a and 40b. The phase difference will be described later.

The receiver 5 includes plural receiving antennas 51 that configure an array antenna and plural individual receivers 52 connected to the plural receiving antennas 51. In this embodiment, the receiver 5 includes, for example, four receiving antennas 51 and four individual receivers 52. The four individual receivers 52 correspond to the four receiving antennas 51, respectively. Each of the four receiving antennas 51 receives the reflection wave from an object and each of the individual receivers 52 processes a reception signal obtained by the corresponding receiving antenna 51.

Each of the individual receivers 52 includes a mixer 53 and an AD converter 54. After the reception signal obtained from the reflection wave received by each of the receiving antennas 51 is amplified by a low noise amplifier (not illustrated), the reception signal is sent to the mixer 53. The transmission signal is input to the mixer 53 from the oscillator 42 of the transmitter 4 and the transmission signal and the reception signal are mixed by the mixer 53. Thus, a beat signal is generated. The beat signal represents a beat frequency that is a frequency difference between the transmission signal and the reception signal. After the beat signal generated by the mixer 53 is converted into a digital signal by the AD converter 54, the digital beat signal is output to the signal processor 6.

The signal processor 6 includes a microcomputer that has a CPU, a memory 65, etc. The signal processor 6 stores various data for calculation in the memory 65. Examples of the memory 65 are an erasable programmable read only memory (EPROM) and a flash memory. The memory 65 stores a first parameter 65*a* and a second parameter 65*b* for the phase adjustment of the transmission signal. In the phase adjustment of the transmission signal, described later, one of the plural parameters is used, depending on a mounted state of the radar apparatus 1 on the host vehicle. Details of the first parameter 65*a* and the second parameter 65*b* will be described later.

The signal processor 6 includes the transmission controller 61, a Fourier transformer 62 and a data processor 7 as functions implemented by software of the microcomputer.

The transmission controller 61 controls the signal generator 41 and the phase adjuster 43. The transmission controller 61 obtains information relating to the mounted state of the radar apparatus 1 from an acceleration sensor 81, described later. The transmission controller 61 determines the mounted state of the radar apparatus 1 on the host vehicle based on the information relating to the obtained mounted state and reads out a parameter from the memory 65, depending on the mounted state. Moreover, the transmission controller 61 outputs the command signal relating to the phase adjustment of the transmission signal based on the phase information in the parameter, to the phase adjusting parts 43*a* and 43*b*.

The Fourier transformer 62 performs fast Fourier transformation (FFT) of the beat signal output from each of the plural individual receivers 52. Thus, the Fourier transformer 62 transforms the beat signal relating to the reception signal received by each of the plural receiving antennas 51 to a frequency spectrum that is data of a frequency range. The frequency spectrum obtained by the Fourier transformer 62 is input to the data processor 7.

The data processor 7 derives the target information (longitudinal distance, relative speed, lateral distance and height distance) based on the frequency spectrum transformed from the reception signal received by each of the plural receiving antennas 51. The data processor 7 outputs the derived target information to the vehicle controller 2.

The acceleration sensor 81 detects a gravity acceleration that is the information relating to the mounted state of the radar apparatus 1. The acceleration sensor 81 detects the gravity acceleration of the radar apparatus 1 when the radar apparatus 1 is mounted on the host vehicle and transmits the gravity acceleration to the transmission controller 61.

1-3. Antenna Configuration

Figure 3:
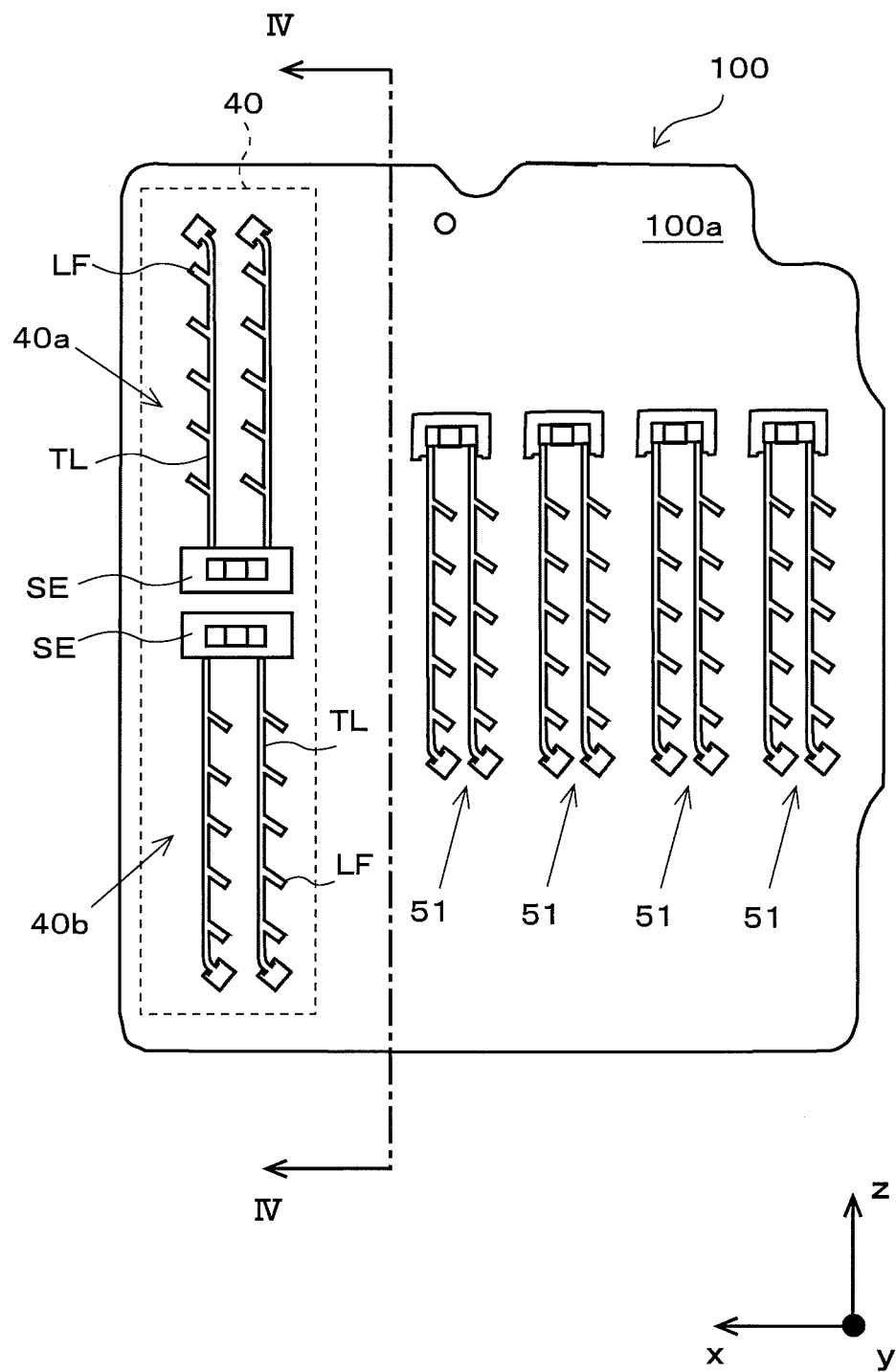
FIG. 3 illustrates a transmitting antenna and receiving antennas.

Next, concrete configurations of the transmitting antenna 40 and the receiving antennas 51 are explained with reference to FIG. 3. FIG. 3 illustrates the transmitting antenna 40 and the receiving antennas 51. The transmitting antenna 40 and the receiving antennas 51 are provided to a mounted surface of a dielectric substrate 100*a* of an antenna substrate 100. In FIG. 3, directions are explained by using an x-axis, a y-axis and a z-axis. The x-axis, the y-axis and the z-axis are fixed relative to at least one of the transmitting antenna 40 and the receiving antennas 51.

The x-axis direction (horizontal direction) corresponds to a shorter-side direction of the transmitting antenna 40 and the receiving antennas 51 (hereinafter referred to simply as "shorter-side direction"). The y-axis direction corresponds to a direction in which the transmission wave is transmitted by the transmitting antenna 40 (hereinafter referred to as "transmission direction") and to a direction in which the reflection wave is received by the receiving antennas 51 (hereinafter referred to as "reception direction"). The z-axis direction (vertical direction) corresponds to a longitudinal direction of the transmitting antenna 40 and the receiving antennas 51 (hereinafter referred to simply as "longitudinal direction").

Next, the configuration of the transmitting antenna 40 is explained. Each of the transmitting antennas 40*a* and 40*b* of the transmitting antenna 40 includes a power feeding port SE, and plural transmission lines TL having plural antenna elements LF extend from the power feeding port SE in the longitudinal direction (+z direction and −z direction).

A shape of the transmitting antenna 40*a* is the same as a shape of the transmitting antenna 40*b*. The power feeding ports SE communicate the transmission signals delivered via waveguides to the antenna elements LF through the transmission lines TL. The antenna elements LF output the radio waves based on the transmission signal. As described above, the transmission wave is generated by the mixture of the radio waves simultaneous from the transmitting antennas 40*a* and 40*b*, and then the transmission wave is output to the outside of the host vehicle.

Moreover, the four receiving antennas 51 are provided to the mounted surface of the dielectric substrate 100*a*. The configuration of the receiving antennas 51 is the same as the configuration of the transmitting antenna 40. In other words, each of the receiving antennas 51 has the configuration in which plural transmission lines TL having plural antenna elements LF extend from a power feeding port SE in the longitudinal direction. The antenna elements LF of the receiving antennas 51 receive the reflection waves and communicate the reception signals to the power feeding ports SE via the transmission lines TL.

Figure 4:
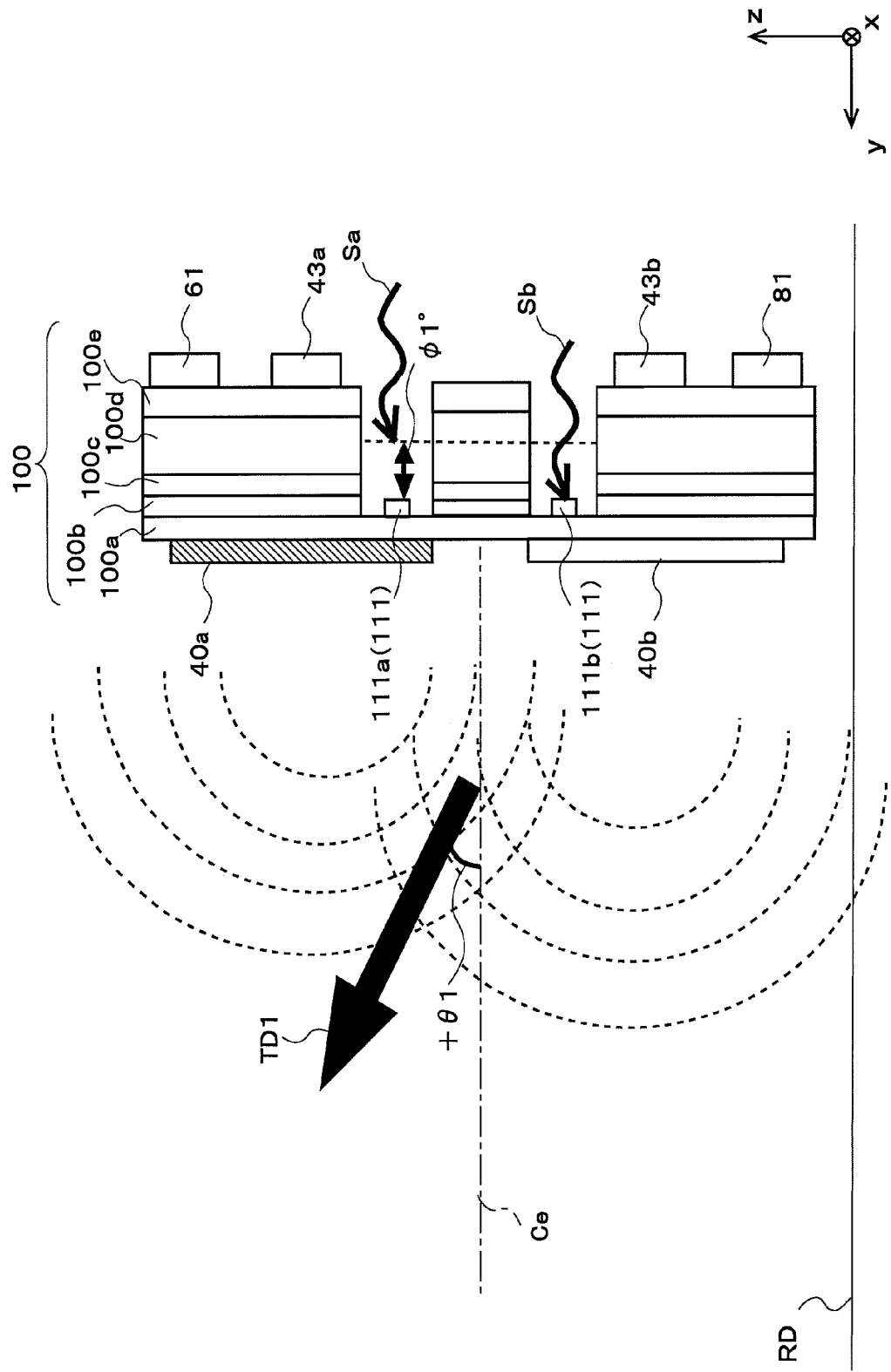
FIG. 4 illustrates a cross-sectional view of an antenna substrate taken along a line IV to IV.

1-4. Transmission Direction of Transmission Wave and Phase of Transmission Signal Next explained is a relationship between the phase of each transmission signal and the transmission direction of the transmission wave transmitted by the transmitting antenna 40. FIG. 4 illustrates a cross-sectional view of the antenna substrate 100 taken along a line IV to IV in FIG. 3. First explained are a configuration of the antenna substrate 100 of the radar apparatus 1 and the mounted state of the radar apparatus 1 that includes the antenna substrate 100 inside a housing of the radar apparatus 1, on the host vehicle.

The transmitting antennas 40 are provided to a surface of the dielectric substrate 100*a* of the antenna substrate 100, and a ground layer 100*b* is provided to an underside surface of the dielectric substrate 100*a*. An antenna housing 100*d* functioning as a chassis is provided to an underside surface of the ground layer 100*b* via an adhesion layer 100*c*. A resin substrate 100*e* is provided to an underside surface of the antenna housing 100*d*, and the transmission controller 61, the phase adjusting parts 43*a* and 43*b*, the acceleration sensor 81, etc. are provided on the resin substrate 100*e*.

The radar apparatus 1 including the antenna substrate 100 inside the housing of the radar apparatus 1 is mounted, for example, in a front bumper of the host vehicle such that the longitudinal direction (z-axis direction) of the transmitting antenna 40 corresponds to the height direction of the host vehicle (hereinafter referred to as "vertical direction"), and the shorter-side direction (x-axis direction) of the transmitting antenna 40 corresponds to the left-right direction of the host vehicle. In FIG. 4, the radar apparatus 1 is mounted in a state in which the transmitting antenna 40*a* is positioned higher (+z side) than the transmitting antenna 40*b* in the vertical direction.

Herein, "a predetermined mounted state" is a state in which the radar apparatus 1 is mounted such that the transmitting antenna 40*a* is positioned higher (+z side) than the transmitting antenna 40*b* in the vertical direction, and the acceleration sensor 81 detects the gravity acceleration of the radar apparatus 1 in the predetermined mounted state and outputs the gravity acceleration to the transmission controller 61.

The transmission controller 61 reads out from the memory 65 the parameter for the phase adjustment of the transmission signal corresponding to the predetermined mounted state, based on information of the obtained gravity acceleration. For example, the parameter corresponding to the predetermined mounted state is the first parameter 65*a*. Then, the transmission controller 61 outputs the command signal relating to the phase adjustment to the phase adjuster 43, based on the first parameter 65*a*.

The phase adjusting parts 43*a* and 43*b* adjust phase of a transmission signal necessary to be adjusted among a transmission signal Sa and a transmission signal Sb, based on the command signal relating to the phase adjustment output from the transmission controller 61. Concretely, the phase adjuster 43 adjusts the phase such that the phase of the transmission signal Sa is behind the phase of the transmission signal Sb. More concretely, the phase adjuster 43 adjusts the phase such that a phase difference between the transmission signal Sa and the transmission signal Sb is φ1°.

Since the transmission signal Sa is delivered to a driven element 111 φ1° behind the transmission signal Sb, radio waves having the phases different from each other are output from the transmitting antenna 40*a* and the transmitting antenna 40*b*. The transmission wave generated by mixture of the radio waves from the transmitting antenna 40*a* and the transmitting antenna 40*b* is output in an upward direction at an angle of +θ1 shown by an arrow TD1 relative to a transmission axis Ce that is horizontal to a road surface RD. The transmission axis Ce is a virtual axis extending from the radar apparatus 1 in the substantially horizontal direction relative to the road surface RD.

The transmission signal output as described above spreads to some extent in the vertical direction. The front vehicle existing on the road surface RD and a billboard, a traffic sign, etc. existing above the road surface RD are included in a transmission range of the transmission wave, and the receiving antennas 51 receive the reflection waves reflected from those objects.

Figure 5:
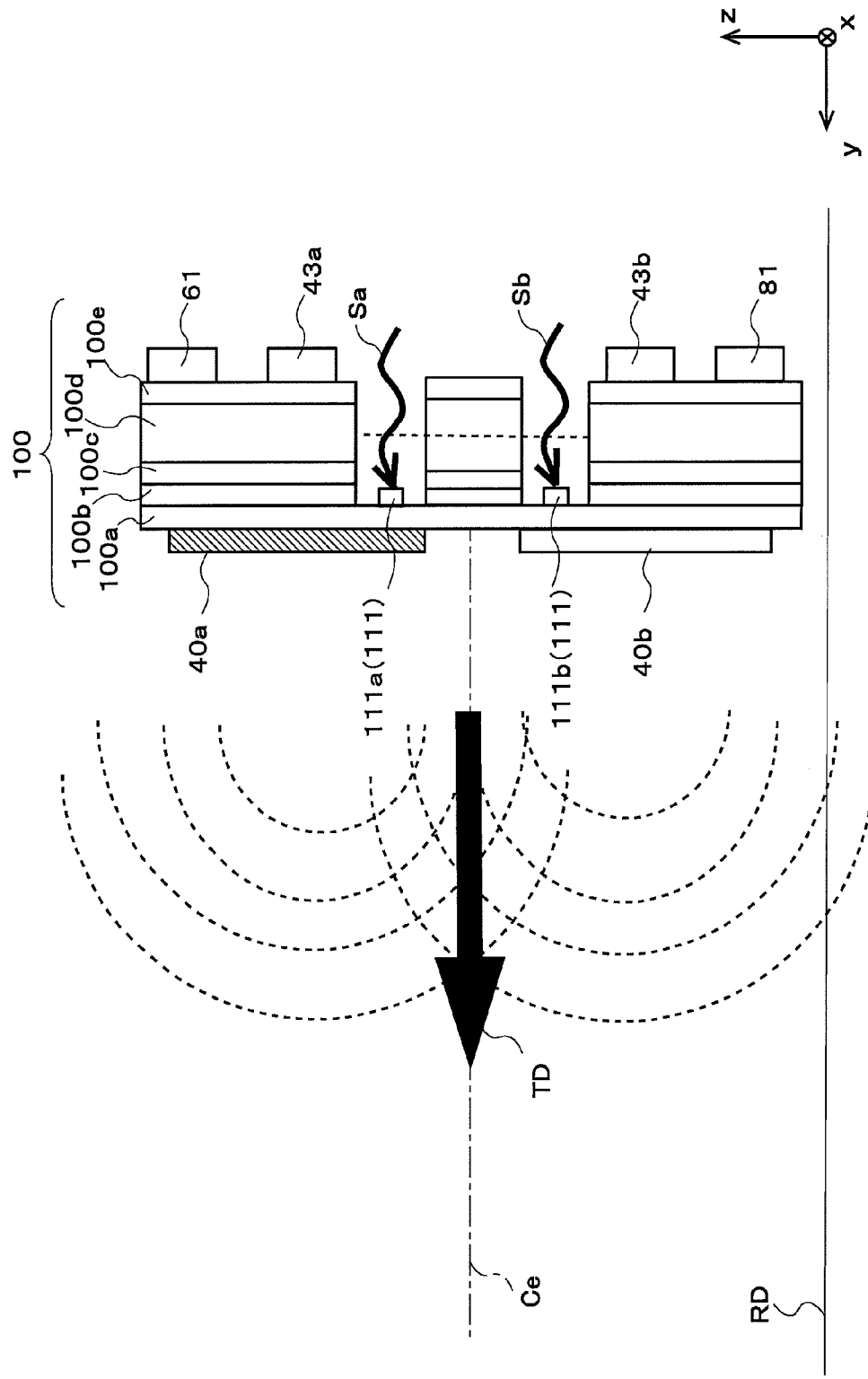
FIG. 5 illustrates a sectional view of the antenna substrate to explain a phase of a transmission signal.

FIG. 5 illustrates a sectional view of the antenna substrate 100 of which a configuration is the same as a configuration of the antenna substrate 100 in FIG. 4, to explain a phase of the transmission signal of a transmission wave output in the horizontal direction in which the transmission axis Ce extends. The radar apparatus 1 in FIG. 5 is mounted on the host vehicle in the same predetermined mounted state as the radar apparatus 1 in the FIG. 4. Therefore, the transmission controller 61 outputs the command signal relating to the phase adjustment to the phase adjuster 43, based on the first parameter. Concretely, the phase adjuster 43 adjusts the phase such that the phases of the transmission signals Sa and Sb are the same. Since the transmission signal Sa is delivered to the driven element 111 in the same phase as the transmission signal Sb, the transmission wave generated by the mixture of the radio waves from the transmitting antenna 40*a* and the transmitting antenna 40*b* in the same phase is output.

As a result, the transmission wave generated by the mixture of the radio waves from the transmitting antenna 40*a* and the transmitting antenna 40*b* is output in a horizontal direction shown by an arrow TD. The transmission wave output as described above spreads to some extent in the vertical direction. The front vehicle existing on the road surface and the billboard, the traffic sign, etc. existing above the road surface are included in the transmission range of the transmission wave, and the receiving antennas 51 receive the reflection waves reflected by those objects.

The transmitting antennas 40*a* and 40*b* output the transmission signals alternately in the upward direction shown by the arrow TD1 and in the horizontal direction shown by the arrow TD, according to the phase adjustment performed by the phase adjusting parts 43*a* and 43*b* based on the command signal output based on the first parameter 65*a*.

The radar apparatus 1 derives the height distance of the target in the vertical direction based on the reflection waves of the transmission waves reflected by the target.

1-5. Transmission Timing and Transmission Cycle of Transmission Wave

Figure 6:
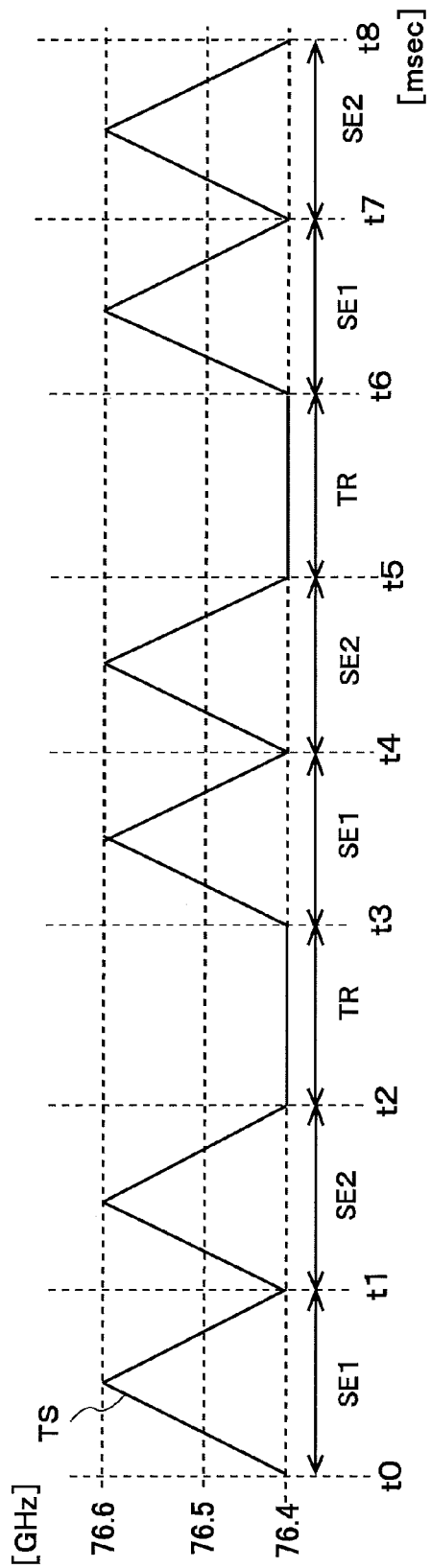
FIG. 6 illustrates transmitting timing and a transmission cycle of transmission waves.

Next explained are transmission timing and a transmission cycle of the transmission waves transmitted in the upward direction and in the horizontal direction. FIG. 6 illustrates the transmission timing and the transmission cycle of the transmission waves. A horizontal axis of the graph in FIG. 6 represents time (msec) and a vertical axis represents frequency (GHz). A signal waveform TS shows a state of a modulated frequency of the transmission signal. The transmission signal is modulated with time in a range of ±100 MHz from a center frequency of 76.5 GHz.

The transmitting antenna 40 outputs the transmission wave corresponding to the transmission signal of which the frequency is modulated, in the upward direction in a first time period SE1 from a time point t0 to a time point t1. Moreover, the transmitting antenna 40 outputs the transmission wave corresponding to the transmission signal of which the frequency is modulated, in the horizontal direction in a second time period SE2 from the time point t1 to a time point t2. An output order of the transmission waves that are output in the upward direction and in the horizontal direction may be reversed.

The data processor 7 derives the target information including the height distance, etc. of the target, in a signal processing period TR from the time point t2 to a time point t3, based on the reception signal. The radar apparatus 1 performs the process from the time point t0 to the time point t3 as one cycle and the process is repeatedly performed.

1-6. Phase Adjustment in a Case of Upside-Down Mounted State

Figure 7:
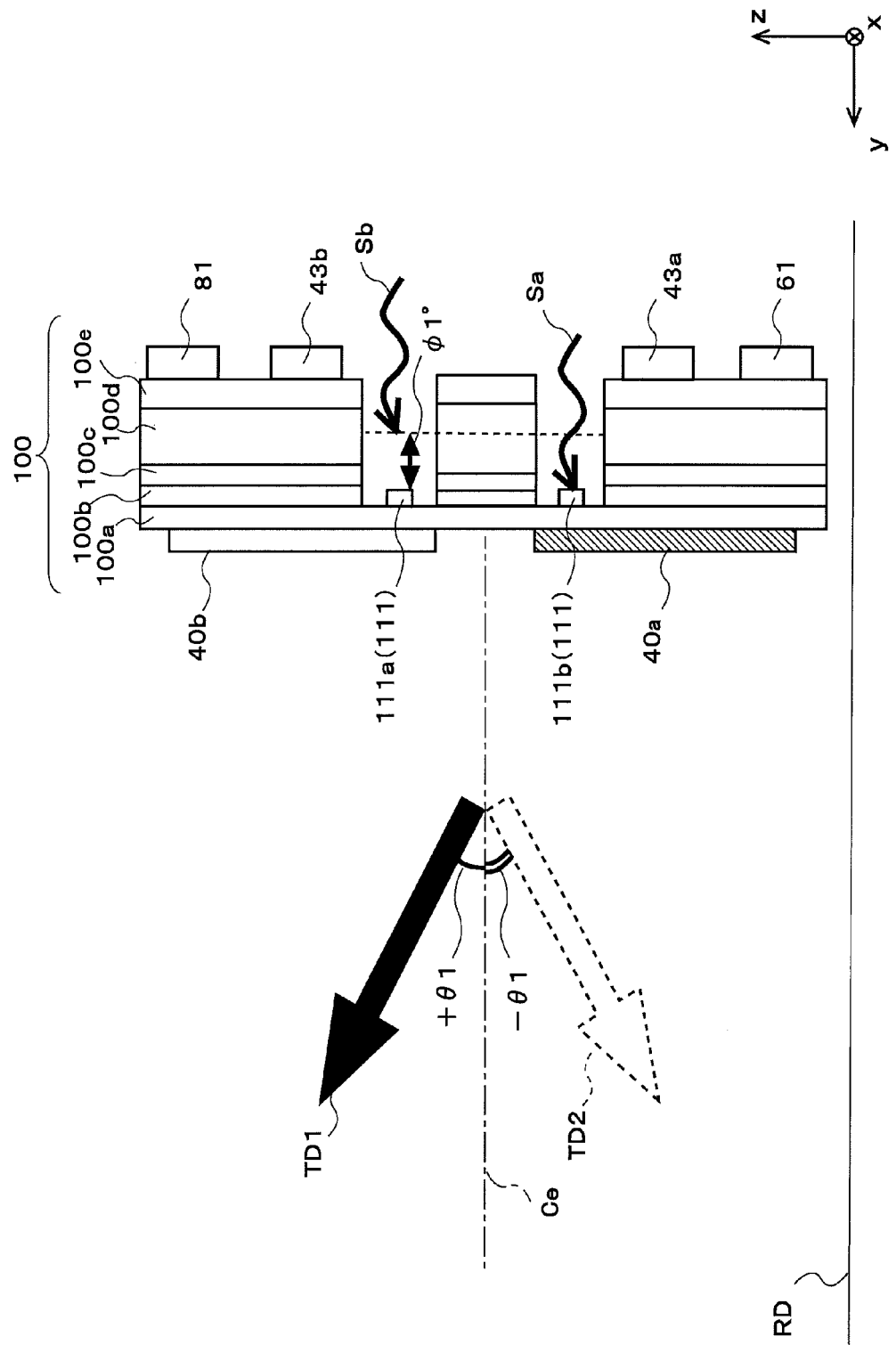
FIG. 7 illustrates a phase of a transmission signal in a case of an upside-down mounted state.

Next explained is phase adjustment of the transmission signal in a case where the radar apparatus 1 is mounted upside down, in other words, a case where the mounted state of the radar apparatus 1 on the host vehicle is upside-down as compared to the predetermined mounted state. FIG. 7 illustrates a phase of the transmission signal in a case where the radar apparatus 1 is mounted upside down.

In FIG. 7, the radar apparatus 1 is mounted in a state in which the transmitting antenna 40b is positioned higher (+z side) than the transmitting antenna 40a in the vertical direction. In other words, the transmitting antenna 40a is positioned lower (−z side) than the transmitting antenna 40b in the vertical direction. Such a mounted state is deemed as a state in which the radar apparatus 1 is mounted upside down as compared to the predetermined mounted state (hereinafter referred to as "upside-down mounted state").

In the case where the radar apparatus 1 is in the upside-down mounted state, the transmission wave output in the first time period SE1 explained with reference to FIG. 6 is output in a downward direction at the angle of −θ1 relative to the transmission axis Ce shown by an arrow TD2, and the transmission wave output in the second time period SE2 is output in the horizontal direction. In such a case where the transmission single is not output in the upward direction, the radar apparatus 1 cannot derive the height distance of an upper object such as a billboard and a traffic sign, existing above the road surface RD. Therefore, the radar apparatus 1 determines the mounted state and performs the phase adjustment of the transmission signal, as described below.

The transmission controller 61 obtains from the acceleration sensor 81 a gravity acceleration of the radar apparatus 1 mounted in the upside-down mounted state and reads out the second parameter 65b from the memory 65 based on the obtained gravity acceleration. The transmission controller 61 sets, for example, the gravity acceleration of the radar apparatus 1 mounted on the host vehicle in the predetermined mounted state as a reference value. The transmission controller 61 compares the gravity acceleration of the radar apparatus 1 mounted on the host vehicle in the upside-down mounted state, with the reference value, and determines whether or not the radar apparatus 1 is mounted in the upside-down mounted state.

The second parameter 65b is a parameter including the phase information corresponding to the upside-down mounted state of the radar apparatus 1. The transmission controller 61 outputs the command signal relating to the phase adjustment based on the second parameter 65b, to the phase adjuster 43. The phase adjusting parts 43a and 43b adjust the phases of the corresponding transmission signal. Concretely, the phase adjuster 43 adjusts the phase such that the transmission signal Sb is behind the phase of the transmission signal Sa and such that a phase difference between the transmission signal Sa and the transmission signal Sb is $\varphi 1°$. As a result, even in the case where the radar apparatus 1 is mounted upside down as compared to the predetermined mounted state, the radar apparatus 1 can output the transmission signal in the upward direction.

The radar apparatus 1 is mounted on the host vehicle in the upside-down mounted state, not in the predetermined mounted state, because the radar connector of the radar apparatus 1, used to mount the radar apparatus 1, is located far from the vehicle connector of the host vehicle so that it is difficult to connect those two connectors in the predetermined mounted state via a cable of a predetermined length.

For example, there is a case where the radar connector is located on a right side surface of the housing of the radar apparatus 1 mounted in the predetermined mounted state. In this case, if the vehicle connector is provided to a position near from a left side surface of the housing of the radar apparatus 1, in other words, if the vehicle connector is provided to a position far from the right side surface of the housing, it may be impossible to connect those connectors via a cable without mounting the radar apparatus 1 upside down as compared to the predetermined mounted state. Therefore, the radar apparatus 1 is mounted on the vehicle in the upside-down state as compared to the predetermined mounted state and the radar apparatus 1 can be connected to the vehicle via the cable. As a result, the radar apparatus 1 can adjust the transmission direction of the transmission signal to the predetermined direction, regardless of the mounted state of the radar apparatus 1 on the host vehicle.

1-7. Parameter for Phase Adjustment

Next, examples of the first parameter 65a and the second parameter 65b for the phase adjustment are described. FIG. 8 illustrates the phase information of the first parameter 65a and the second parameter 65b. Each of those parameters 65a and 65b includes the phase information used in the first time period SE1 and the second time period SE2. The first parameter 65a shown in FIG. 8 is a parameter used by the transmission controller 61 in the case where the radar apparatus 1 is mounted in the predetermined mounted state.

Based on the command signal output based on the first parameter 65a in the first time period SE1, the phase adjuster 43 adjusts the phase such that the phase of the transmission signal Sa is $\varphi 1°$ behind the phase of the transmission signal Sb. Therefore, the phases of the transmission signal Sa and the transmission signal Sb in the first time period SE1 are $-\varphi 1°$ and $\pm 0°$, respectively. Thus, the transmission wave generated by the mixture of the radio waves from the transmitting antennas 40a and 40b is output in the upward direction shown by the arrow TD1.

Based on the command signal output based on the first parameter 65a in the second time period SE2, the phase adjuster 43 adjusts the phase such that the phase of the transmission signal Sa is the same as the phase of the transmission signal Sb. Therefore, the phases of the transmission signals Sa and Sb are both $\pm 0°$ in the second time period SE2. Thus, the transmission wave generated by the mixture of the radio waves from the transmitting antennas 40a and 40b is output in the horizontal direction shown by the arrow TD.

The second parameter 65b is the parameter used by the transmission controller 61 in the case where the radar apparatus 1 is mounted in the upside-down mounted state.

Based on the command signal output based on the second parameter 65b in the first time period SE1, the phase adjuster 43 adjusts the phase such that the phase of the transmission signal Sb is $\varphi 1°$ behind the phase of the transmission signal Sa. Therefore, the phases of the transmission signal Sa and the transmission signal Sb in the first time period SE1 are $\pm 0°$ and $-\varphi 1°$, respectively. As mentioned above, the phases of the transmission signals Sa and Sb based on the second parameter 65b are opposite to the phases of the transmission signals Sa and Sb based on the first parameter 65a. Thus, the transmission wave generated by the mixture of the radio waves from the transmitting antennas 40a and 40b is output in the upward direction shown by the arrow TD1.

Based on the command signal output based on the second parameter 65b in the second time period SE2, the phase adjuster 43 adjusts the phase such that the phase of the transmission signal Sa is the same as the phase of the transmission signal Sb. Therefore, the phases of the transmission signals Sa and Sb are both $\pm 0°$ in the second time period SE2. As described above, the phases of the transmission signals Sa and Sb based on the second parameter 65b and the phases of the transmission signals Sa and Sb based on the first parameter 65a are the same in the second time period SE2. Thus, the transmission wave generated by the mixture of the radio waves from the transmitting antennas 40a and 40b is output in the horizontal direction shown by the arrow TD.

1-8. Process Flowchart

Figure 9:
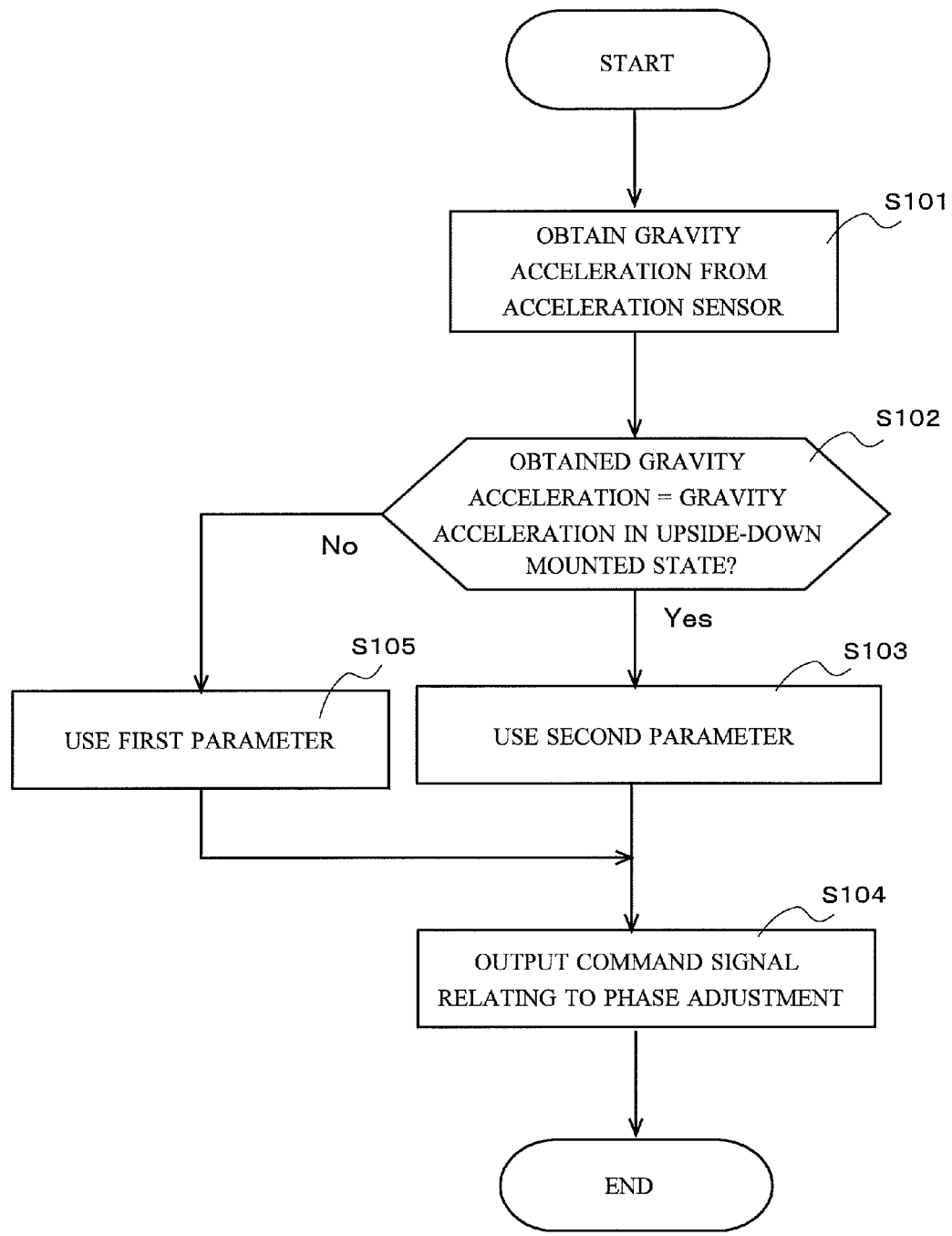
FIG. 9 illustrates a process flowchart of phase adjustment performed in a first embodiment.

FIG. 9 illustrates a process flowchart of the phase adjustment performed in the first embodiment. The transmission controller 61 obtains the gravity acceleration from the acceleration sensor 81 (a step S101). The transmission controller 61 determines whether or not the gravity acceleration is the gravity acceleration to be detected in the case where the radar apparatus 1 is mounted in the upside-down mounted state (a step S102).

In a case where the transmission controller 61 obtains the gravity acceleration of the radar apparatus 1 to be detected in the upside-down mounted state (Yes in the step S102), the transmission controller 61 reads out the second parameter 65b from the memory 65 and uses the second parameter 65b as the parameter for the phase adjustment (a step S103). Then, the transmission controller 61 outputs the command signal relating to the phase adjustment based on the second parameter 65b, to the phase adjuster 43 (a step S104).

In the step S102, in a case where the transmission controller 61 obtains the gravity acceleration to be detected in the predetermined mounted state (No in the step S102), the transmission controller 61 reads out the first parameter 65a from the memory 65 and uses the first parameter 65a as the parameter for the phase adjustment (a step S105). Then, the transmission controller 61 outputs the command signal relating to the phase adjustment based on the first parameter 65a, to the phase adjuster 43 (the step S104). Thus, the radar apparatus 1 can adjust the transmission direction to the predetermined direction, regardless of the mounted state of the radar apparatus 1.

In a case where a parameter used in the steps S103 and S105 is preset, the transmission controller 61 does not change the parameters but uses the preset parameter continuously.

Second Embodiment

Next, a second embodiment is explained. In the first embodiment, the transmission controller 61 determines the mounted state of the radar apparatus 1 on the host vehicle based on the gravity acceleration and then outputs the signal relating to the phase adjustment, depending on the determined mounted state, to the phase adjuster 43. On the other hand, in the second embodiment, a transmission controller 61 performs a process of determining a mounted state of a radar apparatus 1 based on a reception state of a reflection wave received from a target during traveling of a vehicle after a radar apparatus 1 is mounted on the vehicle. A configuration and a process of the radar apparatus 1 in the second embodiment are substantially the same as the configuration and the process of the radar apparatus 1 in the first embodiment. However, the radar apparatus 1 in the second embodiment does not include the acceleration sensor 81 described in the first embodiment. Therefore, the process performed by the transmission controller 61 for phase adjustment is different from the process performed in the first embodiment. A difference is mainly hereinafter described with reference to FIG. 10 and FIG. 11.

2-1. Process Flowchart

Figure 10:
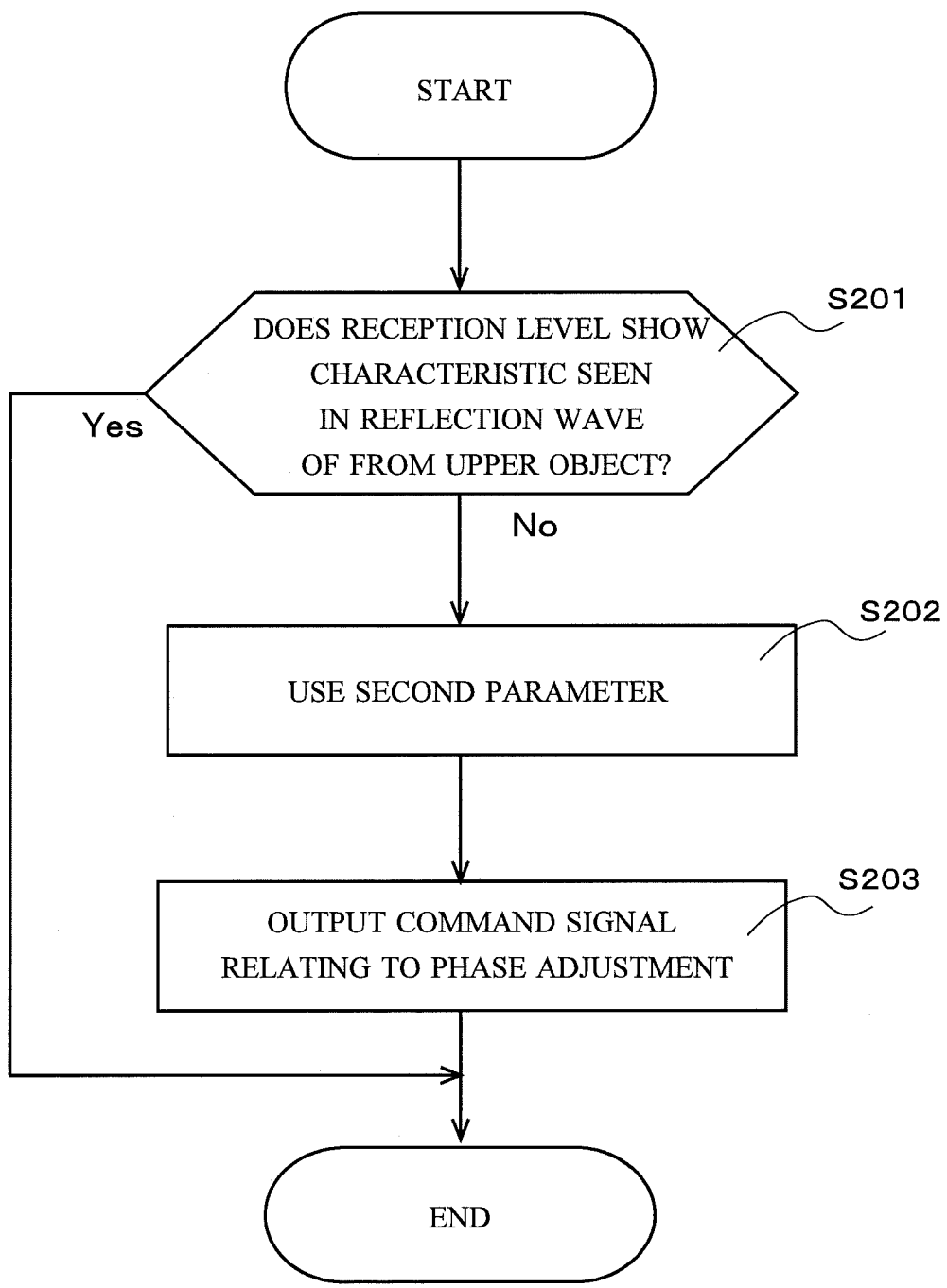
FIG. 10 illustrates a process flowchart of phase adjustment performed in a second embodiment.

FIG. 10 illustrates a process flowchart of the phase adjustment performed in the second embodiment. The transmission controller 61 in the second embodiment reads out a first parameter 65a from a memory 65 regardless of the mounted state of the radar apparatus 1 on a vehicle, and outputs a command signal relating to the phase adjustment based on the first parameter 65a, to a phase adjuster 43. The phase adjuster 43 adjusts the phases of transmission signals Sa and Sb based on the command signal from the transmission controller 61. In a case where the radar apparatus 1 is mounted in a predetermined mounted state, a transmission wave is output in an upward direction shown by an arrow TD1 in a first time period SE1. In a case where the radar apparatus 1 is mounted in an upside-down mounted state, the transmission wave is output in a downward direction shown by an arrow TD2 in the first time period SE1.

Therefore, as shown in the process flowchart in FIG. 10, the transmission controller 61 determines whether or not a reception level of the reflection wave that is the transmission wave reflected by an object shows a characteristic seen in reception of the reflection wave reflect by an upper object, such as a billboard and a traffic sign existing above a road surface (a step S201). In a case where the reception level shows the characteristic of the reflection wave reflected by the upper object (Yes in the step S201), the transmission controller 61 ends the process. In the case where the reception level shows the characteristic of the reflection wave reflected by the upper object, the transmission is output in the upward direction in the first time period SE1. Therefore, the preset first parameter is continuously used for the phase adjustment for the transmission signal.

On the other hand, in a case where the reception level does not show the characteristic of the reflection wave reflected by the upper object, in other words, in a case where the reception level show a characteristic of the reflection wave reflected by a lower object, such as a manhole and a fallen object, the transmission controller 61 uses a second parameter 65b (a step S202). Then, the transmission controller 61 outputs the command signal relating to the phase adjustment based on the second parameter 65b, to the phase adjuster 43 (a step S203). In the case where the reception level shows the characteristic of the reflection wave reflected by the lower object, the transmission wave is output in the downward direction in the first time period SE1. Therefore, the transmission controller 61 changes the preset first parameter to the second parameter for the phase adjustment of the transmission signal. Thus, the radar apparatus 1 can adjust a transmission direction of the transmission wave to a predetermined direction even after the radar apparatus 1 is mounted on the vehicle.

Figure 11:
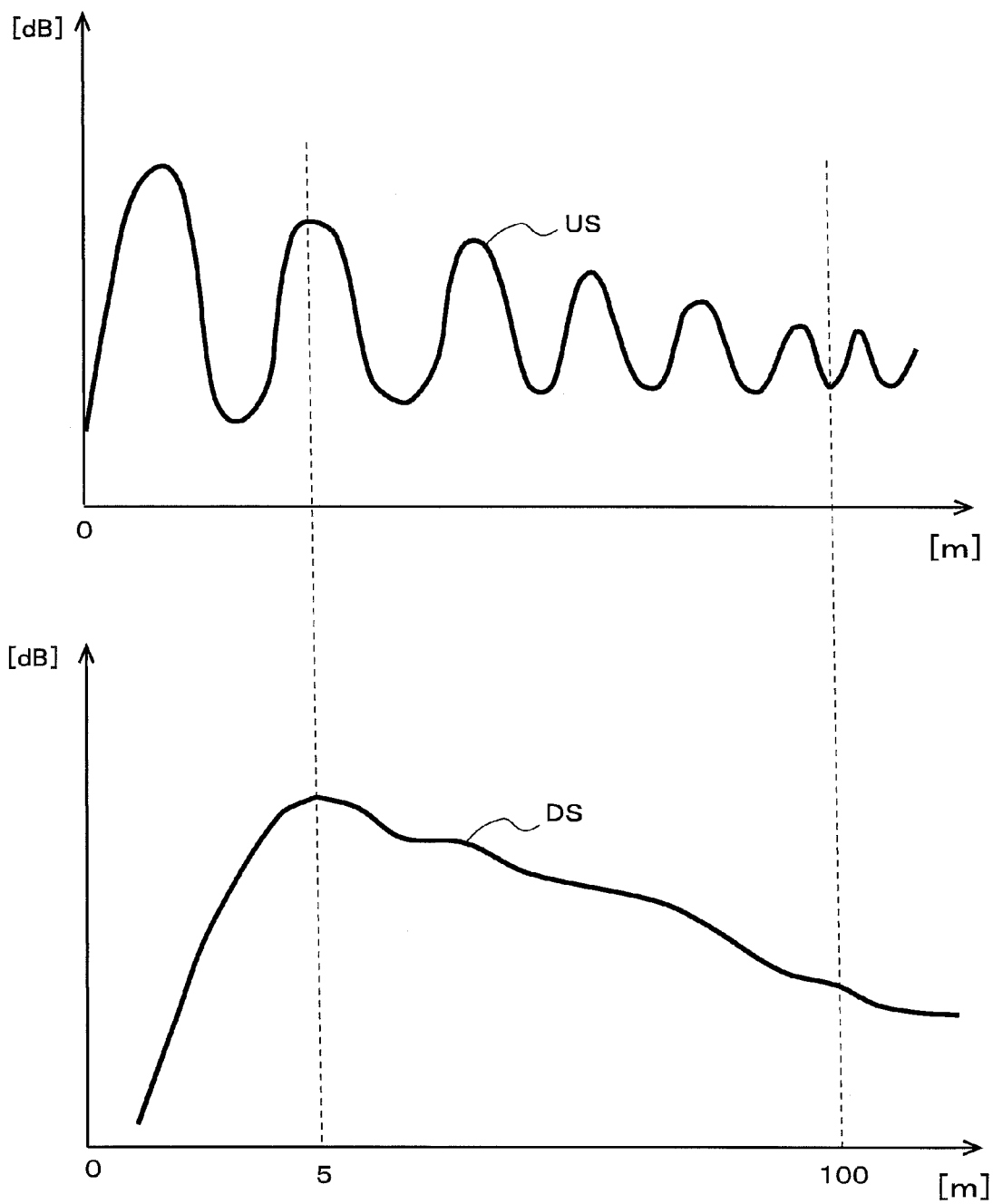
FIG. 11 illustrates graphs showing characteristics of reception levels of reflection waves from an upper object and a lower object.

2-2. Characteristic Graphs Showing Reception Levels from Upper Object and Lower Object FIG. 11 illustrates characteristics graphs showing examples of the reception levels of the reflection waves reflected by the upper object and the lower object. Horizontal axes and vertical axes of the graphs in FIG. 11 represent longitudinal distance (m) and reception level (dB) of the reflection waves, respectively. A signal waveform US of an upper graph in FIG. 11 shows the reception level of the reflection wave reflected by the upper object. The signal waveform US shows a change in the reception level of, for example, a case where the longitudinal distance between the host vehicle and the upper object is shorten from a long distance of 100 m to a short distance of 5 m. As the longitudinal distance becomes shorter, the reception level of the signal waveform US becomes greater and amplitude of the reception level changes periodically.

In a case where the transmission wave is transmitted in the upward direction and then is reflected by the upper object, two types of the reflection waves are possibly received by receiving antennas 51 of the radar apparatus 1. One of the two types is a direct reflection wave that is received directly by the receiving antennas 51 from the upper object without involving another object. The other is the reflection wave of multipath (hereinafter referred to as multipath reflection wave) that is received by the receiving antennas 51 after the reflection wave from the upper object is reflected by a road surface RT. A phase difference may be caused between a reception signal of the direct reflection wave and a reception signal of the multipath reflection wave, depending on paths of the signals to the receiving antennas 51. For example, the phase difference between the signals is, for example, 180°. A combined signal is generated by the reception of the direct reflection wave and the multipath reflection wave by the receiving antennas 51. The reception level of the combined signal changes periodically, as shown in the signal waveform US.

A signal waveform DS of a lower graph in FIG. 11 shows the reception level of the reflection wave reflected by the lower object. The signal waveform DS shows a change in the reception level of, for example, a case where the longitudinal distance between the host vehicle and the lower object is shorten from the long distance of 100 m to the short distance of 5 m. The shorter the longitudinal distance is, the greater the reception level of the signal waveform DS is, like the case of the upper object. However, since the lower object is lower than the upper object in the vertical direction, amplitude fluctuation seen in the signal waveform US of the upper object is not caused. Then, in a case where the longitudinal distance between the host vehicle and the lower object is even shorter (e.g. less than 5 m), the lower object moves out of a transmission range of the transmission wave. As a result, the reception level of the reflection wave from the lower object decreases significantly. The reception levels of the reflection waves reflected by the upper object and by the lower object show those different characteristics. The transmission controller 61 determines the mounted state of the radar apparatus 1 based on those characteristics.

Third Embodiment

Next, a third embodiment is explained. The first embodiment explains the cycle of transmission of the transmission wave in the upward direction (the first time period SE1), transmission of the transmission wave in the horizontal direction (the second time period SE2) and signal processing (signal processing period TR). The third embodiment explains a configuration where a transmission wave is transmitted also in a downward direction, in addition to in an upward direction and a horizontal direction.

A configuration and a process of a radar apparatus 1 in the third embodiment are substantially the same as the configuration and the process of the radar apparatus 1 in the first embodiment. However, transmission timing of the transmission wave and a parameter for phase adjustment are partially different. A difference is mainly hereinafter described with reference to FIG. 12 to FIG. 15.

3-1. Transmission Timing and Transmission Cycle of Transmission Wave

Figure 12:
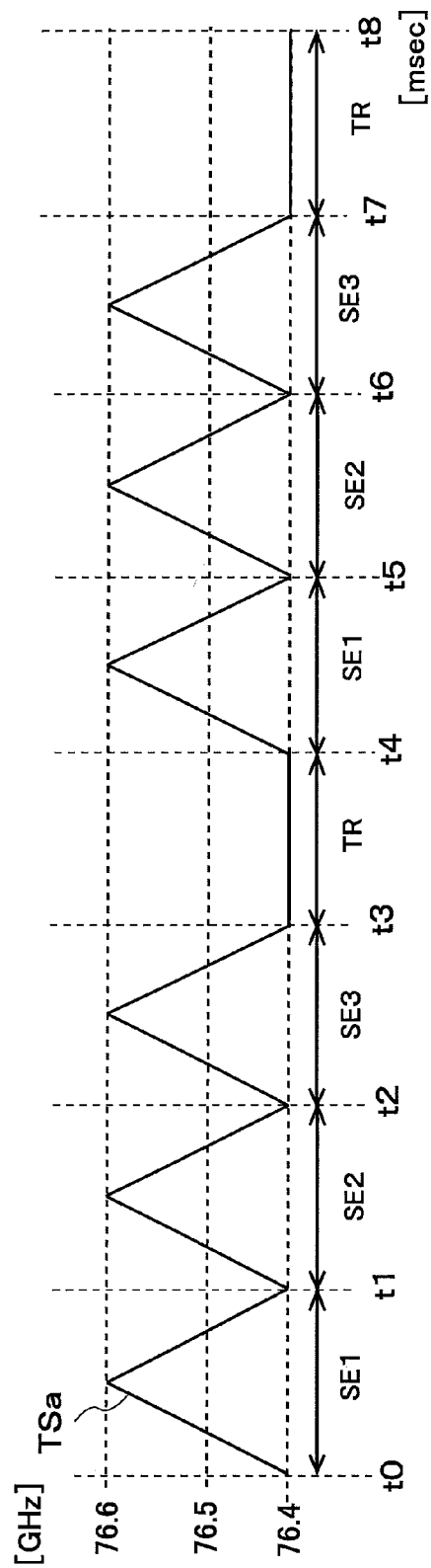
FIG. 12 illustrates transmission timing and a transmission cycle of a transmission wave.

FIG. 12 illustrates the transmission timing and a transmission cycle of the transmission wave. A signal waveform TSa shows a state of a modulated frequency of the transmission wave. The transmission wave is transmitted in the upward direction relative to a transmission axis Ce in a first time period SE1 from a time point t0 to a time point t1. Moreover, the transmission wave is transmitted in the horizontal direction relative to the transmission axis Ce in a second time period SE2 from the time point t1 to a time point t2. Further, the transmission wave is transmitted in the lower direction relative to the transmission axis Ce in a third time period SE3 from the time point t2 to a time point t3. Then, in a signal processing period TR from the time point t3 to a time point t4, the transmission waves transmitted from a transmitting antenna 40 in the first time period SE1, the second time period SE2 and the third time period SE3 are reflected by an object and receiving antennas 51 receive the reflection waves. As a result, a data processor 7 derives target information including a height distance and the like. The process performed in the period from the time point t0 to the time point t4 is one cycle, and the process is performed repeatedly.

3-2. Parameter for Phase Adjustment

Next, the parameter for the phase adjustment is explained. FIG. 13 illustrates phase information of a first parameter 65a and a second parameter 65b in the third embodiment. Each of those parameters 65a and 65b includes the phase information used in each of the first time period SE1 and the second time period SE2.

The first parameter 65a and the second parameter 65b in FIG. 13 also include phase information used in the third time period SE3 in addition to the phase information used in the first time period SE1 and the second time period SE2 described in the first embodiment.

In a case where the radar apparatus 1 is mounted in a predetermine mounted state, a phase adjuster 43 adjusts the phase such that the phase of a transmission signal Sb is $\varphi 2°$ behind the phase of a transmission signal Sa in the third time period SE3 explained with reference to FIG. 12. Therefore, the phases of the transmission signal Sa and the transmission signal Sb based on the first parameter 65a in the third time period SE3 are ±0° and −$\varphi 2°$, respectively. Thus, the transmission wave generated by mixture of the radio waves from the transmitting antennas 40a and 40b based on the first parameter 65a is output in the downward direction.

Figure 14:
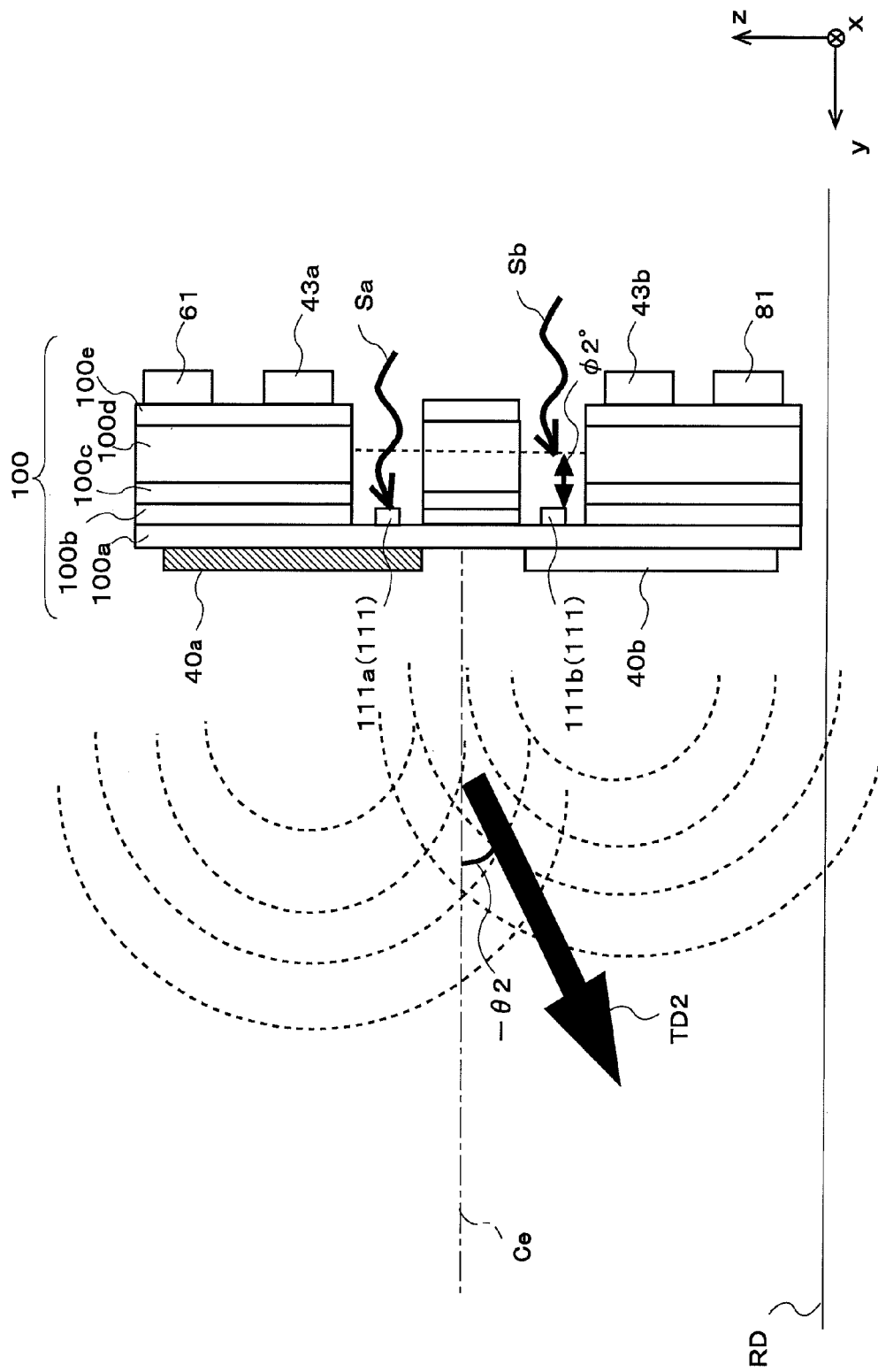
FIG. 14 illustrates a transmission direction of a transmission wave in a case where a radar apparatus is mounted in a predetermined mounted state.

Concretely, as shown in FIG. 14, in the case where the radar apparatus 1 is mounted in the predetermined mounted state, the transmission wave is output in the downward direction relative to the transmission axis Ce at an angle −θ2 shown by an arrow TD2. The phase adjuster 43 adjusts the phases of the transmission signal Sa and the transmission signal Sb such that the phase of the transmission signal Sb is $\varphi 2°$ behind the phase of the transmission signal Sa.

Next, in a case where the radar apparatus 1 is mounted in an upside-down mounted state, the phase adjuster 43 adjusts the phase such that the phase of the transmission signal Sa is $\varphi 2°$ behind the phase of the transmission signal Sb in the third time period SE3 explained with reference to FIG. 12. Therefore, the phases of the transmission signal Sa and the transmission signal Sb in the third time period SE3 are −$\varphi 2°$ and ±0°, respectively. In other words, as shown in FIG. 13, the phases of the transmission signals Sa and Sb based on the second parameter 65b are opposite to the phases of the transmission signals Sa and Sb based on the first parameter 65a. Thus, the transmission wave generated by the mixture of the radio waves from the transmitting antennas 40a and 40b based on the second parameter 65b is output in the downward direction.

Figure 15:
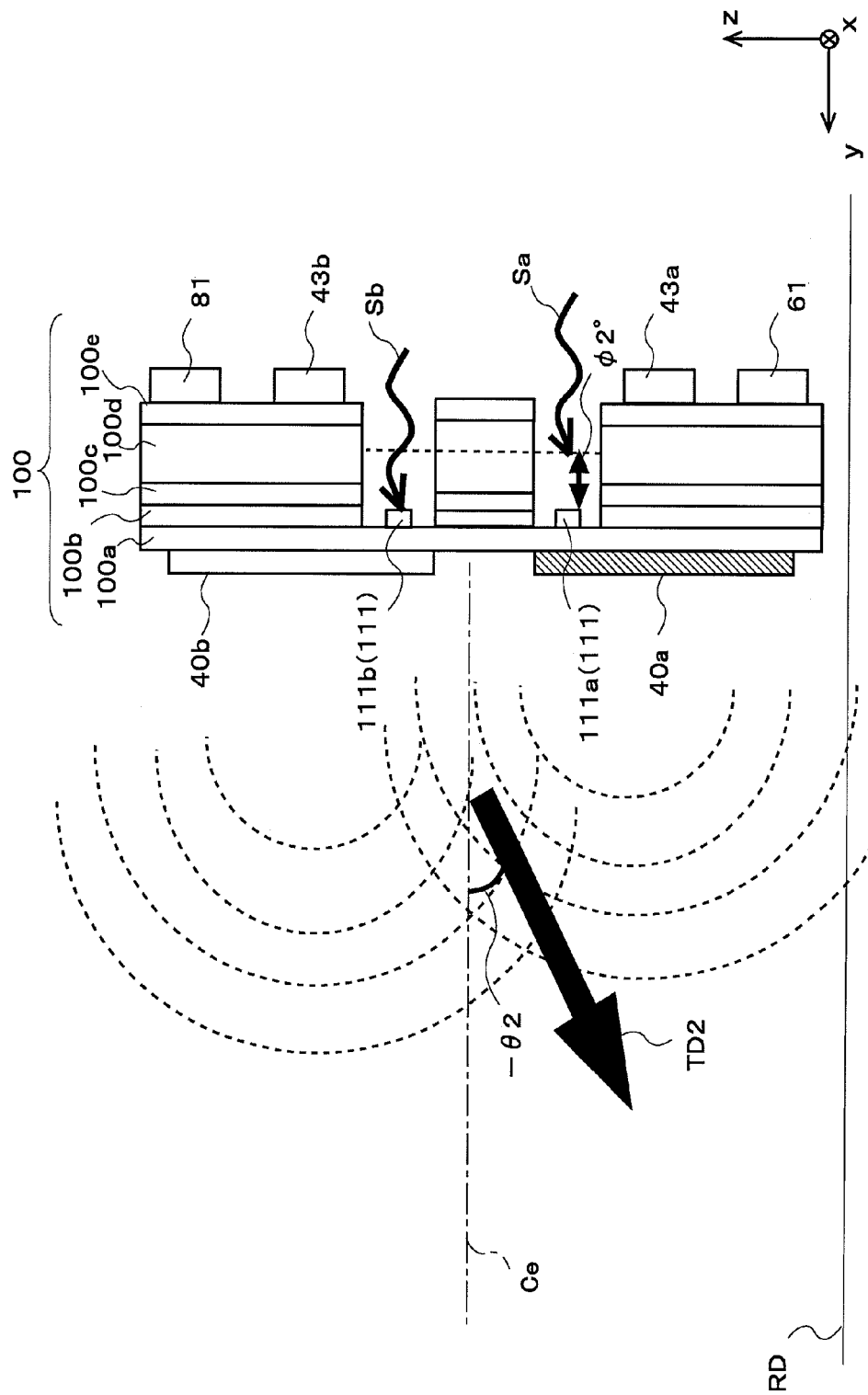
FIG. 15 illustrates a transmission direction of a transmission wave in a case where a radar apparatus is mounted in an upside-down mounted state.

Concretely, as shown in FIG. 15, in the case where the radar apparatus 1 is mounted in the upside-down mounted state, the transmission wave is output in the downward direction relative to the transmission axis Ce at the angle −θ2 shown by the arrow TD2. Each of the transmission signals Sa and Sb is adjusted by the corresponding phase adjuster 43 such that the phase of the transmission signal Sa is 42° behind the phase of the transmission signal Sb. Thus, even in the case where the radar apparatus 1 is mounted in the upside-down mounted state, the radar apparatus 1 can adjust the transmission direction of the transmission wave to a predetermined direction. Also, the radar apparatus 1 can output the transmission waves in the upper direction, in the horizontal direction and in the downward direction in a predetermined order.

MODIFICATIONS

The embodiments of the invention are described above. However, the invention is not limited to the foregoing embodiments but various modifications are possible. Such modifications are hereinafter explained. Any of all forms including the foregoing embodiments and the modifications explained below may be arbitrarily combined.

Figure 16:
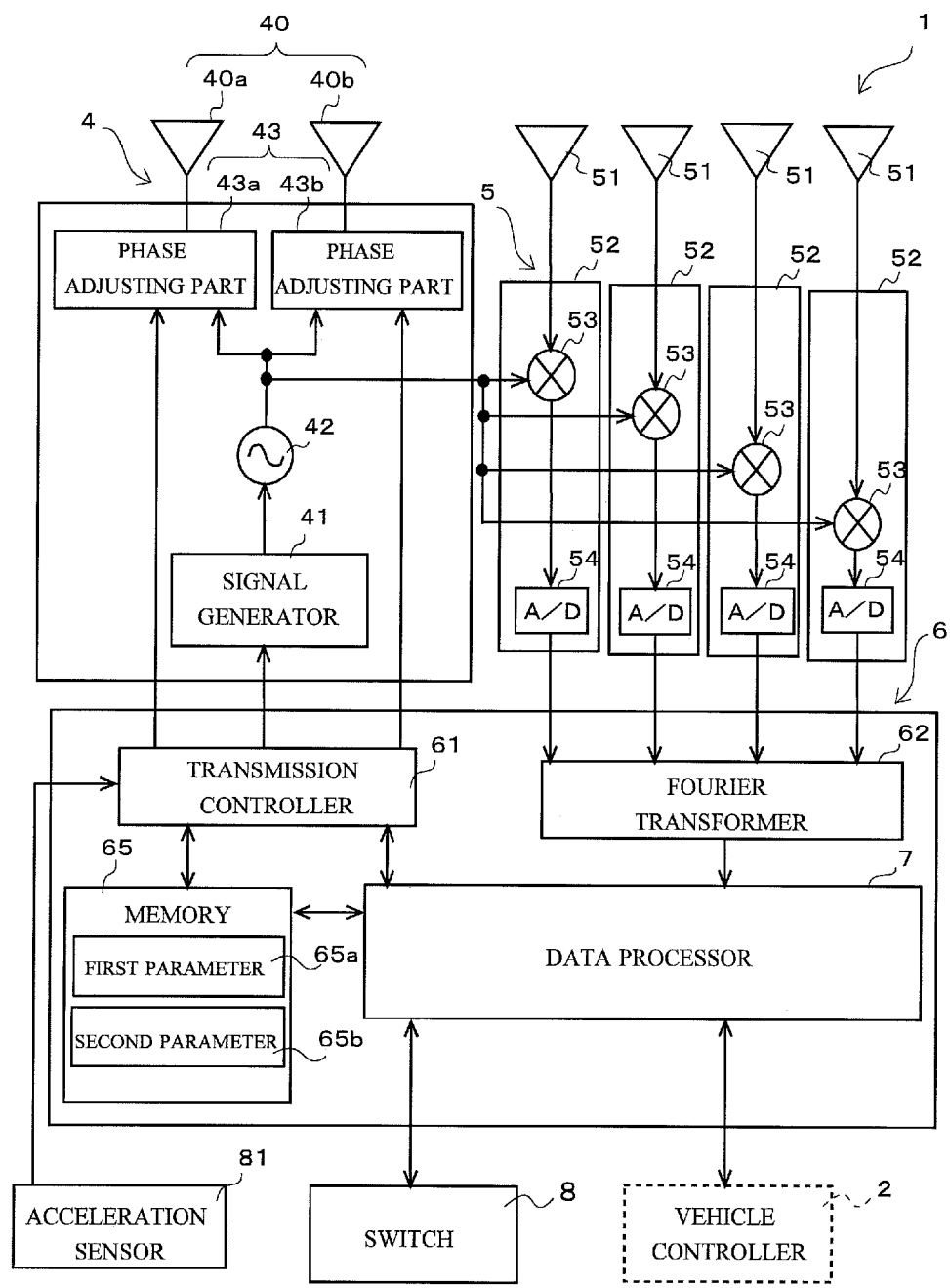
FIG. 16 illustrates a radar apparatus of a modification.

The foregoing first embodiment explains the method in which the transmission controller 61 determines the mounted state of the radar apparatus 1 based on the gravity acceleration detected by the acceleration sensor 81 provided to a radar apparatus 1, as a method of determining the mounted state of the radar apparatus 1. Except that method, as shown in FIG. 16, a switch 8 operable by a user may be provided to a radar apparatus 1. The user identifies a mounted state of the radar apparatus 1 and operates the switch 8. The switch 8 is electrically connected to a data processor 7. Therefore, a transmission controller 61 obtains operation information about an operation made by the user with the switch 8, from the data processor 7, and adjusts a phase of a transmission signal by using a parameter according to the operation information. Thus, the radar apparatus 1 can adjust a transmission direction of a transmission wave to a predetermined direction based on the operation made by the user with the switch 8. Moreover, in addition to the operation made by the user, the switch 8 may be automatically switched over when the mounted stated of the radar apparatus 1 is changed. Further, the switch 8 may be provided to a host vehicle, instead of the radar apparatus 1.

Moreover, the foregoing first embodiment explains that in the case where the radar apparatus 1 that transmits the transmission wave in the upward direction is mounted upside down, the transmission wave to be transmitted in the downward direction is transmitted in the upward direction by the phase adjustment of the transmission signal, as an example. Such phase adjustment of the transmission signal may be used for a different transmission direction (e.g. left-right direction).

Moreover, in the foregoing embodiment, the phase adjuster 43 adjusts the phases of the transmission signals Sa and Sb. On the other hand, a phase adjuster 43 may adjust a phase of only one of the transmission signals Sa and Sb. Therefore, the phase adjuster 43 may be provided to only one of plural transmitting antennas, instead of providing to each of the transmitting antennas.

Further, in the foregoing embodiment, the two types of the first parameter 65a and the second parameter 65b are described as the parameters for the phase adjustment. However, the parameters are not limited to those two parameters but the parameters may be three or more.

The foregoing embodiment explains the four receiving antennas 51 and the transmitting antenna 40 including two antennas. However, if those antennas are plural, numbers of the transmitting antenna 40 and the receiving antennas 51 may be other than two and four described above.

In the foregoing embodiment, the radio wave is output from the transmitting antennas 40a and 40b. However, if the target information can be derived, the transmitting antennas 40a and 40b may output ultrasonic waves, light, laser, etc. other than the radio wave.

Further, in the foregoing embodiment, the radar apparatus 1 is mounted on the vehicle. However, the radar apparatus 1 may be used for others, such as airplanes, ships, boats and the like, except a vehicle.

In the foregoing embodiment, the various functions are implemented by software using the CPU executing the arithmetic processing in accordance with the program. However, a part of the functions may be implemented by an electrical hardware circuit. Contrarily, a part of functions implemented by hardware may be implemented by software.

While the invention has been shown and described in detail, the foregoing description is in all aspects illustrative and not restrictive. It is therefore understood that numerous other modifications and variations can be devised without departing from the scope of the invention.

What is claimed is:

1. A radar apparatus that is mounted on a vehicle, the radar apparatus comprising:
   a transmitting antenna comprising a first antenna and a second antenna that transmit transmission waves;
   a signal processor configured to determine a mounted state of the radar apparatus on the vehicle; and
   a phase adjuster that adjusts at least one of phases of transmission signals output to the first antenna and the second antenna of the transmitting antenna, wherein
   the signal processor controls the phase adjuster to adjust the at least one of the phases of the transmission signals based on the mounted state determined by the signal processor so that
   (i) in a case that the signal processor determines that the radar apparatus is mounted on the vehicle in a predetermined state in which the first antenna is located vertically above the second antenna, the signal processor controls the phase adjuster so that during at least a part of a transmission time, the transmission signal output to the first antenna has a first phase difference and the transmission signal output to the second antenna has a second phase difference that is different from the first phase difference, and
   (ii) in a case that the signal processor determines that the radar apparatus is mounted on the vehicle in an upside-down state in which the first antenna is located vertically below the second antenna, the signal processor controls the phase adjuster so that during at least the part of the transmission time, the transmission signal output to the first antenna has the second phase difference and the transmission signal output to the second antenna has the first phase difference.

2. The radar apparatus according to claim 1, further comprising:
   a memory that stores a plurality of parameters including a first parameter and a second parameter that are phase information of the transmission signals, the second parameter being different from the first parameter, wherein in the case that the signal processor determines that the radar apparatus is mounted on the vehicle in the predetermined state, the signal processor controls the phase adjuster to adjust, based on the first parameter, at least one of the phases of the transmission signals output to the first antenna and the second antenna, and in the case that the signal processor determines that the radar apparatus is mounted on the vehicle in the upside-down state, the signal processor controls the phase adjuster to adjust, based on the second parameter, at least one of the phases of the transmission signals output to the first antenna and the second antenna.

3. The radar apparatus according to claim 1, wherein the signal processor determines the mounted state based on a gravity acceleration obtained from an acceleration sensor of the radar apparatus.

4. The radar apparatus according to claim 1, wherein the signal processor determines the mounted state based on a state of a reception signal of a reflection wave reflected from an object.

5. The radar apparatus according to claim 1 further comprising:
a switch that is operated by a user, wherein
the signal processor determines the mounted state based on an operation state of the switch.

6. A vehicle control system that controls a vehicle, the vehicle control system comprising:
the radar apparatus according to claim 1; and
a vehicle controller that controls the vehicle based on target information output from the radar apparatus.

7. A signal processing method that is performed by a radar apparatus that is mounted on a vehicle, the signal processing method comprising the steps of:

(a) transmitting transmission waves from a first antenna and a second antenna of a transmitting antenna of the radar apparatus;
(b) determining a mounted state of the radar apparatus on the vehicle; and
(c) adjusting at least one of phases of transmission signals output to the first antenna and the second antenna of the transmitting antenna, wherein
the step (c) adjusts the phases of the transmission signals based on the mounted state that has been determined so that
   (i) in a case that the step (b) determines that the radar apparatus is mounted on the vehicle in a predetermined state in which the first antenna is located vertically above the second antenna, the step (c) controls the phase of the transmission signals so that during at least a part of a transmission time, the transmission signal output to the first antenna has a first phase difference and the transmission signal output to the second antenna has a second phase difference that is different from the first phase difference, and
   (ii) in a case that the step (b) determines that the radar apparatus is mounted on the vehicle in an upside-down state in which the first antenna is located vertically below the second antenna, the step (c) controls the phase of the transmission signals so that during at least the part of the transmission time, the transmission signal output to the first antenna has the second phase difference and the transmission signal output to the second antenna has the first phase difference.

* * * * *